April 13, 1943.   P. R. LEA   2,316,438
CONTROLLABLE PITCH PROPELLER
Filed March 18, 1941

INVENTOR.
Percy R. Lea

*Webster & Webster*
ATTORNEYS

Patented Apr. 13, 1943

2,316,438

UNITED STATES PATENT OFFICE 2,316,438

CONTROLLABLE PITCH PROPELLER

Percy R. Lea, Stockton, Calif.

Application March 18, 1941, Serial No. 383,974

12 Claims. (Cl. 170—135.6)

This invention relates to airplane propeller mounting and adjustment; my principal objects being to provide a unit for manually or automatically adjusting the pitch of the propeller blades, which is self-contained, which operates with a negligible lag, and which is faster in operation, simpler and cheaper in construction and requires less upkeep than devices at present in use for this purpose.

These objects I accomplish by means of such structure and relative arrangement of parts as will fully appear by a perusal of the following specification and claims.

In the drawing similar characters of reference indicate corresponding parts in the several views.

Figure 1:
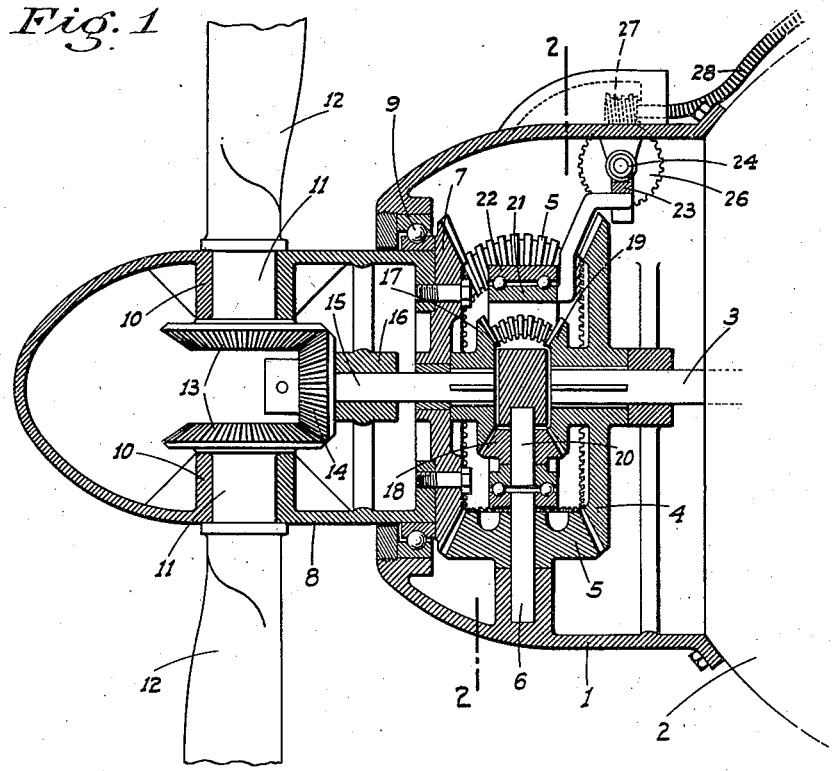
Fig. 1 is a sectional elevation of my improved propeller blade mounting and adjusting unit.
Figure 2:
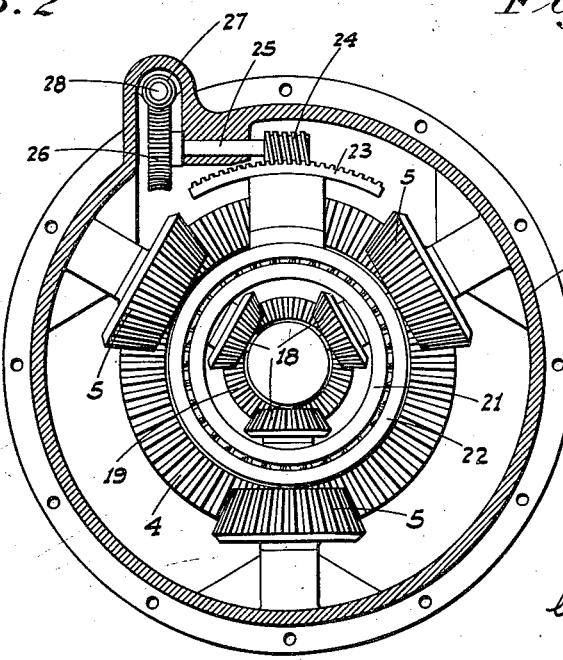
Fig. 2 is a transverse section on the line 2—2 of Fig. 1.

Referring now more particularly to the characters of reference on the drawing, the numeral 1 denotes a rigid substantially cylindrical housing adapted to be secured in fixed connection to one end of the crankcase of the engine of the airplane. The engine shaft or a separate shaft 3 rigidly connected to said engine shaft, projects into the housing axially thereof.

Fixed on the shaft 3 is a bevel gear 4, facing away from the crankcase and meshing with any desired number of bevel pinions 5 mounted on axial stems 6 disposed in a fixed position in the housing in radial relation with the gear 4. The pinions mesh with another bevel gear 7, facing and the same size as gear 4, and of course axially alined therewith. The gear 7 is fixed to a hollow hub member 8, which is turnably supported in the housing 1 at its outer end on suitable bearings 9 of an antifriction type. It will therefore be seen that as the shaft rotates the hub will rotate also.

Turnably mounted in radial bearings 10 formed in the hub are the base spindles 11 of the propeller blades 12, and while two diametrally opposed blades are shown, more may be employed if desired. Fixed on the inner end of the spindles are bevel gears 13 meshing with a bevel pinion 14 disposed therebetween and axially alined with the gears 4 and 7. The pinion 14 is mounted on a shaft 15 turnably supported in a bearing 16 in the hub and also in the hub in the gear 7, the shaft projecting through said gear in turnable relation thereto. If the propeller is of the tractor type, the pinion 14 engages gears 13 at the rear as shown; and is merely reversed in position, without other change to the mechanism, if the propeller is of the pusher type.

Beyond said gear 7, or between the gears 4 and 7, a bevel gear 17 smaller than the gear 7 is fixed on the adjacent end of the shaft 15. This gear meshes with one or more bevel pinions 18 which in turn mesh with a bevel gear 19 of the same size as gear 17 and fixed rigid or made integral with gear 4.

The pinions 18 are mounted on axial spindles 20 disposed radially of the gears and supported in a ring 21 extending about the pinions, concentric with the shafts and gears. This ring is turnably supported by a surrounding ring 22 which is engaged and maintained in a fixed position by the spindles 6 of the pinions 5.

The ring 22 is therefore held against rotation in the housing, and the ring 21 is normally held rigid with the ring 22 by adjustable means which may be either manually or automatically controlled. In the present instance such means is shown as comprising a segmental worm gear 23 rigid with the ring 21 from which the pinions 18 are supported. This gear is engaged by a worm 24 mounted on a shaft 25 which is journaled and extends transversely of the housing 1. A worm gear 26 is mounted on the shaft 25 which in turn is engaged by a worm 27. This worm is mounted on a rotatable shaft 28 extending lengthwise of the housing, and which may project thence rearwardly as a flexible extension past the engine for manual rotation from the pilot's seat.

In operation it will be seen that with the ring 21 normally held stationary, the gear 17 will be driven at the same speed as the gear 7 so that the shaft 15 and pinion 14 thereon are stationary relative to the hub 8, and the hub and propeller blades rotate without any rotation of the blade spindles, so that the blades are maintained in a set position relative to the hub. If, however, the ring 21 is rotated relative to the ring 22 and the housing 1 in one direction or the other, the gear 17 and consequently the pinion 14 will turn faster or slower than the hub as the case may be as long as said ring 21 is being turned. As a result, such relative rotation of the pinion 14 causes the gears 13 to rotate and thus changes the pitch of the blades, as will be evident.

As soon as the rotation of the ring 21 is halted the pinion 14 again turns at the same speed as the hub, and the propeller blades remain set in their adjusted position until such position is again changed by a further rotation of the ring.

Figure 3:
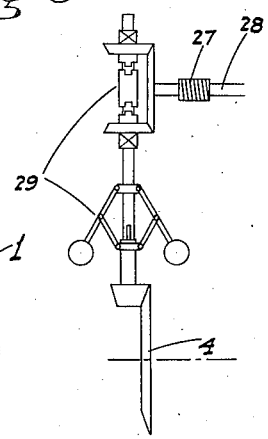
Fig. 3 is a diagram of an automatic governor device for operating the adjusting unit.

A suitable governor device is interposed in the assembly, designed along the best known engineering principles and practice, to automatically control the pitch change in normal range of operations and according to engine speed. While such governor per se forms no part of my invention, I have shown diagrammatically in Fig. 3 a common form of governor device 29 driven from drive gear 4 and operatively connected to worm shaft 28 to rotate the same in one direction or the other, with any change of speed of the gear 4 from a predetermined normal.

It will of course be understood that all movable parts have suitable bearings, the particular type and location of which form no part of this invention. It will also be understood that all parts will be made of the best materials available, and to the highest standards of precision, and that means for proper lubrication will be provided.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An airplane propeller drive and control unit comprises a hub, propeller blades turnably mounted in the hub, a fixed housing supporting the hub for rotation, a bevel drive gear in the housing, a driven bevel gear rigid with the hub and concentric with and facing the drive gear, a bevel pinion fixed in the housing and engaging the drive and driven gears, a bevel gear smaller than and fixed to the drive gear between the drive and driven gears, another bevel gear smaller than and turnable relative to the driven gear in facing relation to the first named bevel gear, a bevel pinion engaging said relatively small bevel gears, connecting means between said other bevel gear and the blades to rotate the latter in opposite directions and relative to the hub when said other gear rotates at a speed different from that of the hub, means mounting said last named bevel pinion for rotation about the axis of the drive gear and means to control the rotation of the mounting means.

2. A unit as in claim 1, in which said connecting means comprises bevel gears fixed on the blades within the hub, a bevel pinion engaging said gears and a shaft connecting the pinion and said other bevel gear and turnably projecting through the driven gear.

3. A unit as in claim 1 in which said mounting means comprises a ring concentric with the drive gear and inside which the last named bevel pinion is mounted and means turnably supporting the ring from the housing; the control means being applied to the ring.

4. A unit as in claim 1 in which said mounting means comprises a ring turnably mounted in the housing concentric with the drive gear and inside which the last named bevel pinion is mounted, and said control means includes a worm gear fixed with the ring, a worm engaging the worm gear, means turnably mounting the work in the housing and means to rotate the worm.

5. An airplane propeller drive and control unit comprising a hub, propeller blades turnably mounted in the hub, a fixed housing supporting the hub for rotation, a bevel drive gear in the housing, a driven bevel gear rigid with the hub and concentric with and facing the drive gear, bevel pinions fixed in the housing in spaced relation about and engaging the drive and driven gears, stub shafts on which said pinions are mounted, a bevel gear smaller than and fixed with the drive gear between the drive and driven gears, another bevel gear smaller than and turnable relative to the driven gear in facing relation to the first named bevel gear, a bevel pinion engaging said relatively small bevel gears, connecting means between said other bevel gear and the blades to rotate the latter in opposite directions and relative to the hub when said other gear rotates at a speed different from that of the hub, a ring concentric with the drive gear radially in from said bevel pinions and supported in a fixed position by said stub shafts, another ring turnably mounted in and supported by said first named ring and inside which said last named bevel pinion is mounted, and means applied to said other ring to control the rotation thereof and including an operating shaft turnably mounted in the housing.

6. A propeller drive and control unit comprising a hub, propeller blades turnably mounted in the hub, means supporting the hub for rotation, means to rotate the hub including a drive gear concentric with the hub, a bevel gear fixed with the drive gear between the first named gear and the blades and facing the latter, another bevel gear turnable relative to the hub mounted concentric therewith in facing relation to the first named bevel gear, drive connections between said other bevel gear and the blades to rotate the latter in opposite directions and relative to the hub when said other gear rotates at a speed different from that of the hub, a bevel pinion engaging said bevel gears, means mounting the pinion for rotation in an arcuate path concentric with the axis of the drive gear, and means to control such rotation of the mounting means.

7. A unit as in claim 6, in which the pinion mounting means comprises a ring mounted concentric with and turnable relative to the drive gear; the control means being applied to the ring.

8. A unit as in claim 6, in which the pinion mounting means comprises a ring mounted concentric with and turnable relative to the drive gear and the control means comprises a worm gear fixed and concentric with the ring, a worm engaging the worm gear, means turnably mounting the worm in a fixed position relative to the hub and means to rotate the worm.

9. A unit as in claim 6, in which the pinion mounting means comprises a ring mounted concentric with and turnable relative to the drive gear and the control means comprises a gear element fixed and concentric with the ring, another rotary gear element engaging the first named element, means mounting said other element in a fixed position relative to the hub, and means to rotate said other element.

10. A propeller drive and control unit comprising a hub, propeller blades turnably mounted in the hub, means supporting the hub for rotation, means to rotate the hub including a drive gear concentric with the hub, a bevel gear fixed with the drive gear between the first named gear and the blades and facing the latter, another bevel gear turnable relative to the hub mounted concentric therewith in facing relation to the first named bevel gear, drive connections between said other bevel gear and the blades to rotate the latter in opposite directions and relative to the hub when said other gear rotates at a speed different from that of the hub, a bevel pinion engaging said bevel gears, a stub shaft radial with the drive gear on which the pinion is mounted, a ring radially out from the pinion from which the pin projects, means turnably mounting the ring for rotation in a path concentric with the drive gear, and means applied to the ring to control the rotation of the same.

11. A structure as in claim 10, in which said ring mounting means comprises another ring surrounding the first named ring and mounted in a fixed position, and bearing elements between the rings.

12. In a propeller drive and control unit, a hub mounted for rotation, propeller blades turnably mounted in the hub, separate and alined drive and driven shafts mounted concentric with the hub, means between the drive shaft and hub to rotate the latter, means connecting the driven shaft and the blades to turn the latter in opposite directions upon rotation of said driven shaft relative to the hub, facing bevel gears on the adjacent ends of the shafts, a pinion engaging the gears, means mounting the pinion for rotation about the axis of the shafts, and means to control such rotation of the mounting means.

PERCY R. LEA.